(12) United States Patent
Weaver et al.

(10) Patent No.: US 8,684,761 B2
(45) Date of Patent: Apr. 1, 2014

(54) SOLAR INSULATION DISPLACEMENT CONNECTOR

(76) Inventors: Jacob Weaver, Deerfield, OH (US); Christopher Volpe, Cleveland, OH (US)

(*) Notice: Subject to any disclaimer, the term of this patent is extended or adjusted under 35 U.S.C. 154(b) by 94 days.

(21) Appl. No.: 13/355,750

(22) Filed: Jan. 23, 2012

(65) Prior Publication Data

US 2012/0329309 A1 Dec. 27, 2012

Related U.S. Application Data

(60) Provisional application No. 61/500,876, filed on Jun. 24, 2011.

(51) Int. Cl.
*H01R 4/24* (2006.01)

(52) U.S. Cl.
USPC ........... 439/404; 439/417; 439/76.1; 136/244

(58) Field of Classification Search
USPC ........................ 439/404, 417, 76.1; 136/244
See application file for complete search history.

(56) References Cited

U.S. PATENT DOCUMENTS

| | | | | |
|---|---|---|---|---|
| 5,637,011 A | * | 6/1997 | Meyerhoefer et al. | 439/409 |
| 5,759,065 A | * | 6/1998 | Hatagishi et al. | 439/596 |
| 6,398,581 B1 | * | 6/2002 | Baier et al. | 439/404 |
| 6,960,716 B2 | * | 11/2005 | Matsumi et al. | 136/244 |
| 7,264,498 B2 | * | 9/2007 | Sakiyama et al. | 439/404 |
| 7,530,827 B2 | * | 5/2009 | Caveney et al. | 439/211 |
| 7,824,191 B1 | * | 11/2010 | Browder | 439/76.1 |
| 7,976,334 B2 | * | 7/2011 | Bishop | 439/404 |

* cited by examiner

*Primary Examiner* — Hien Vu

(57) ABSTRACT

In one embodiment, a solar insulation displacement connector (IDC) is described. The example solar IDC includes a base configured with at least one pathway. The pathway may include a plurality of ridges. At least one pathway is configured with at least one conductive cutter. The conductive cutter is formed from a conductive material (e.g., copper, silver, gold, nickel, brass). The example solar IDC includes a cover configured to hold a wire in the at least one pathway when the cover is affixed to the base of the solar IDC. The solar IDC is configured to be mechanically connected to a conductor of the wire by the at least one conductive cutter. The at least one conductive cutter is configured to cut an insulation of the wire. An inverter is operably connected to the solar IDC. The example solar IDC and the inverter are fabricated as a unit.

15 Claims, 5 Drawing Sheets

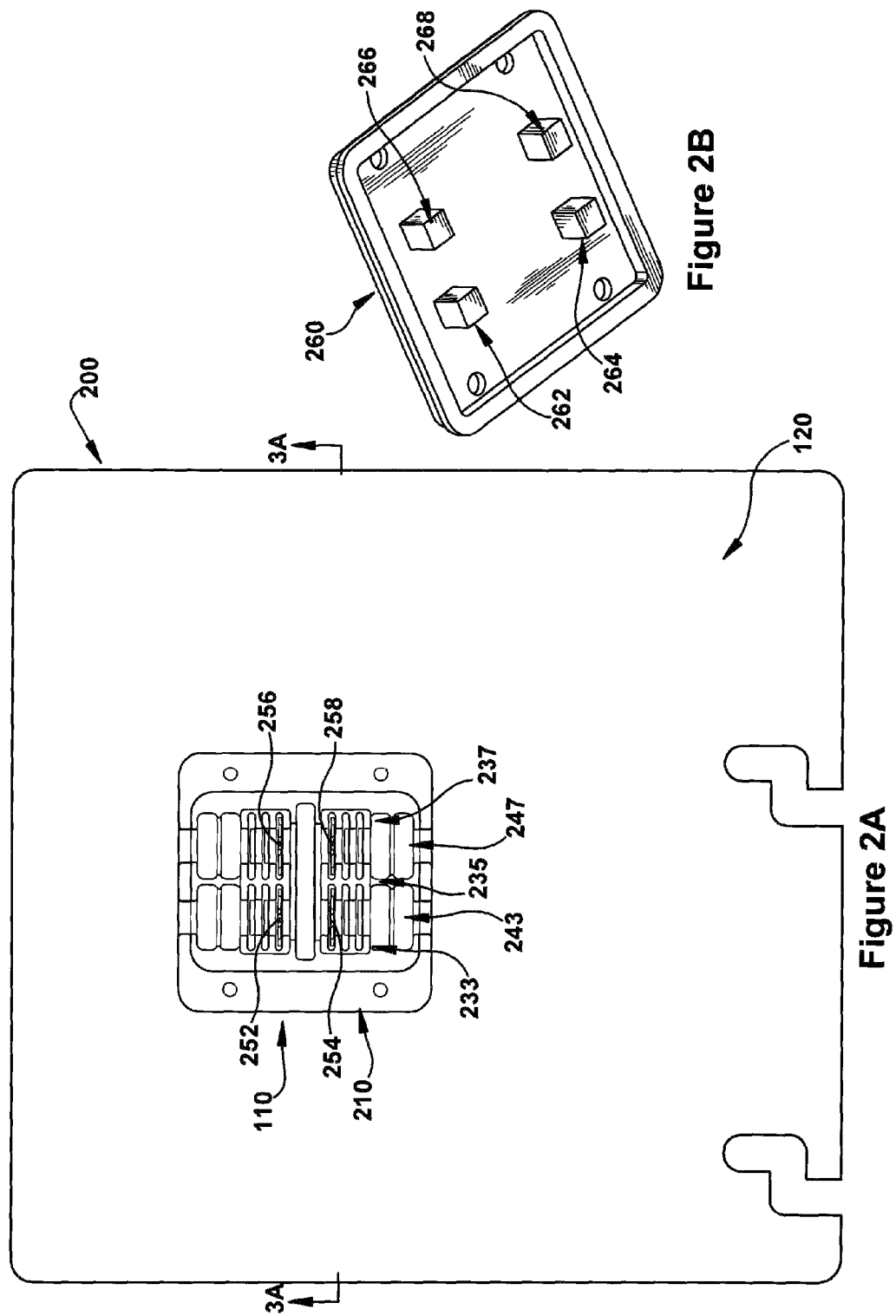

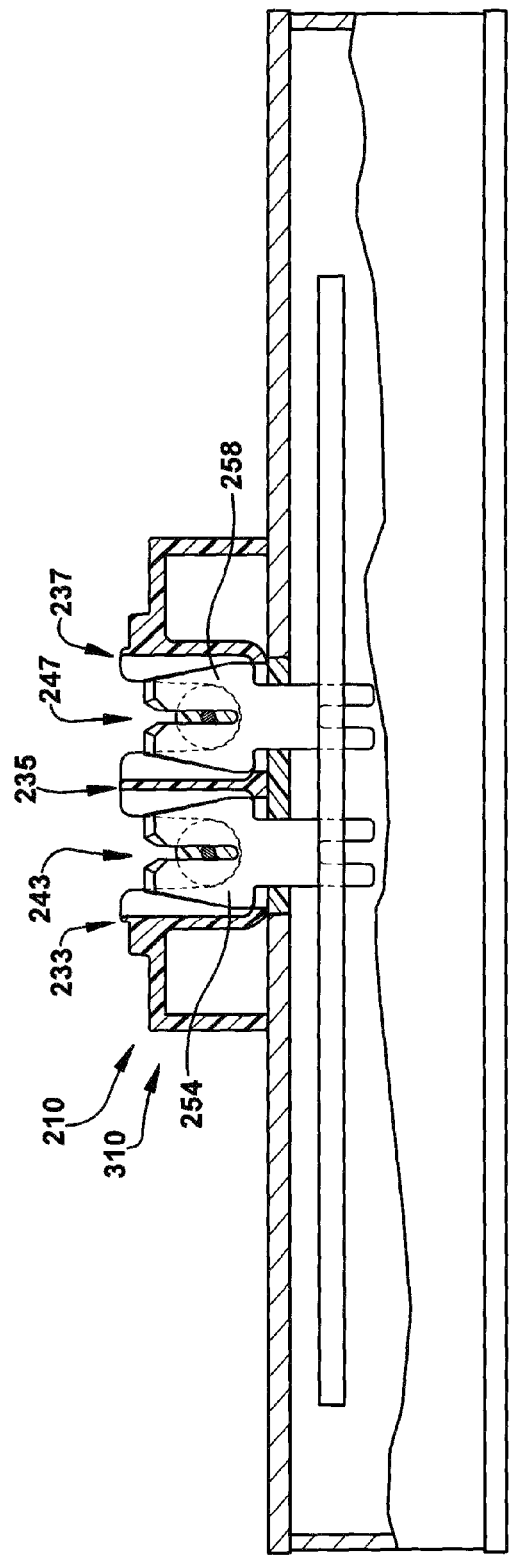
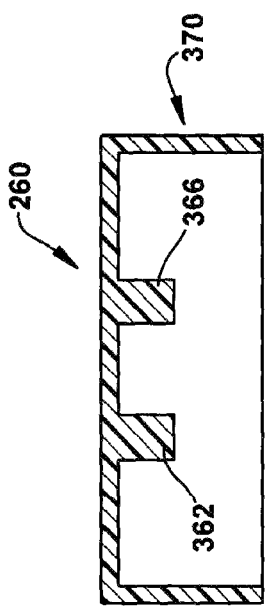
Figure 3A
Figure 3B

SOLAR INSULATION DISPLACEMENT CONNECTOR

CROSS REFERENCE TO RELATED APPLICATIONS

This application claims the benefit of U.S. Provisional Application 61/500,876 filed Jun. 24, 2011 titled Weaver Insulation Displacement Connector.

BACKGROUND

Insulation displacement connector (IDC) technology was originally developed in the telecommunications industry for making multiple connections. IDC technology has been applied in many applications. For example, IDC technology is used in butt connections and splicing of electrical wires. In a butt connection, two wires are electrically connected together. In splicing, a wire is electrically connected to a trunk line. The IDC permits the connections to be made without a separate insulation stripping step because the IDC cuts and displaces the wire insulation with a sharpened conductor contact. Insulation piercing technology differs from IDC technology in that instead of forcing the wire into a sharpened connector, a piercing pointed stake is forced through the insulation and into the conductor.

Conventionally, connections were made by stripping wires and crimping or soldering connections. Stripping wires and crimping or soldering connections is time consuming and problematic especially for work taking place in the field. To avoid stripping, crimping, or soldering connections, connections were made from one electrical device to the next using a pig-tail wire with a factory installed connector (pin) with an environmental seal. The factory installed connector may be mated to a connector on the next electrical device. When the connection is made, an environmental seal is established. In some cases, the pig-tail may be connected to a trunk wire, which is subsequently connected to the next device. The trunk wire may have factory installed mating connectors at specific locations in the wire. Although factory installed mating connectors provide convenient installation, the mating connectors add considerable cost and lack flexibility since wire lengths or positions between connectors on trunk wires are fixed. Furthermore, mating connectors have been shown to have lower reliability than IDC technology.

In a variant of the trunk wire with mating connectors, a flat profile trunk line may utilize a factory installed connector with insulation piercing barbs. The final connection to the trunk line is made by piercing rather than pin based factory installed connectors. The flat profile trunk line is typically proprietary. Using proprietary wires limits options and availability, and also suffers from most of the same cost concerns as the factory installed pig-tail and end connectors. Once the specific piercing connector has been used to pierce a trunk line, the insulation piercing connector can be removed and either the trunk wire replaced or another device connected to the trunk wire at that point using another piercing connector. However, the piercing connectors and trunk wires must be in the same proprietary family of products. Again, this restricts material selection and availability. Also, this piercing connector does not provide the option of a butt connection. If a section of trunk wire must be replaced, either the entire wire must be replaced or a separate butt splice must be performed and environmentally sealed to connect the new section of trunk line to the remaining trunk line.

Existing IDCs are inadequate for use in solar microinverter connection applications. IDC technology is commonly intended for single use and in applications where an environmental seal is required. For example, removing the IDC connector exposes the wire's conductor to the environment at the point where the insulation has been displaced. IDCs that have been used in power line applications have a seal, but if the IDC is removed and replaced by another IDC, the environmental seal is generally not preserved. This is especially problematic in the solar energy context because solar panels are typically located in outdoor areas that are susceptible to environmental conditions. For example, solar panels may be placed on the rooftops of residential homes or even high rises, both of which may endure high winds, precipitation, freezing temperatures, and freeze and thaw conditions.

Existing IDCs are designed for either wire to wire or printed circuit board (PCB) to wire applications. PCB to wire IDCs are not environmentally sealed. In the solar energy context, the trunk line and component parts are connected to the microinverter. The connection with the microinverter is an opportunity for sealant problems to occur due to the insulation or the IDC environment being breached. Furthermore, the mechanical nature of conventional IDCs makes a conventional IDC capable of either a butt connection or a splice connection, but not both in the same connector. Thus, in a situation where either a section of a trunk wire is damaged and needs to be replaced or the end of a trunk wire length and an additional length needs to be added, a combination of several separate environmentally sealed connections would have to be made. This has disadvantages of cost, time, and increased potential for leakage as many environmental seals would need to be maintained.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2A illustrates a top view of an apparatus including a Solar IDC, with the cover of the Solar IDC removed, associated with an inverter.

FIG. 2B illustrates a bottom view of a cover of a Solar IDC.

FIG. 3A illustrates a cross-sectional view of an apparatus including a Solar IDC, with the cover of the Solar IDC removed.

FIG. 3B illustrates a cross-sectional view of a cover of a Solar IDC.

DETAILED DESCRIPTION

Figure 1:
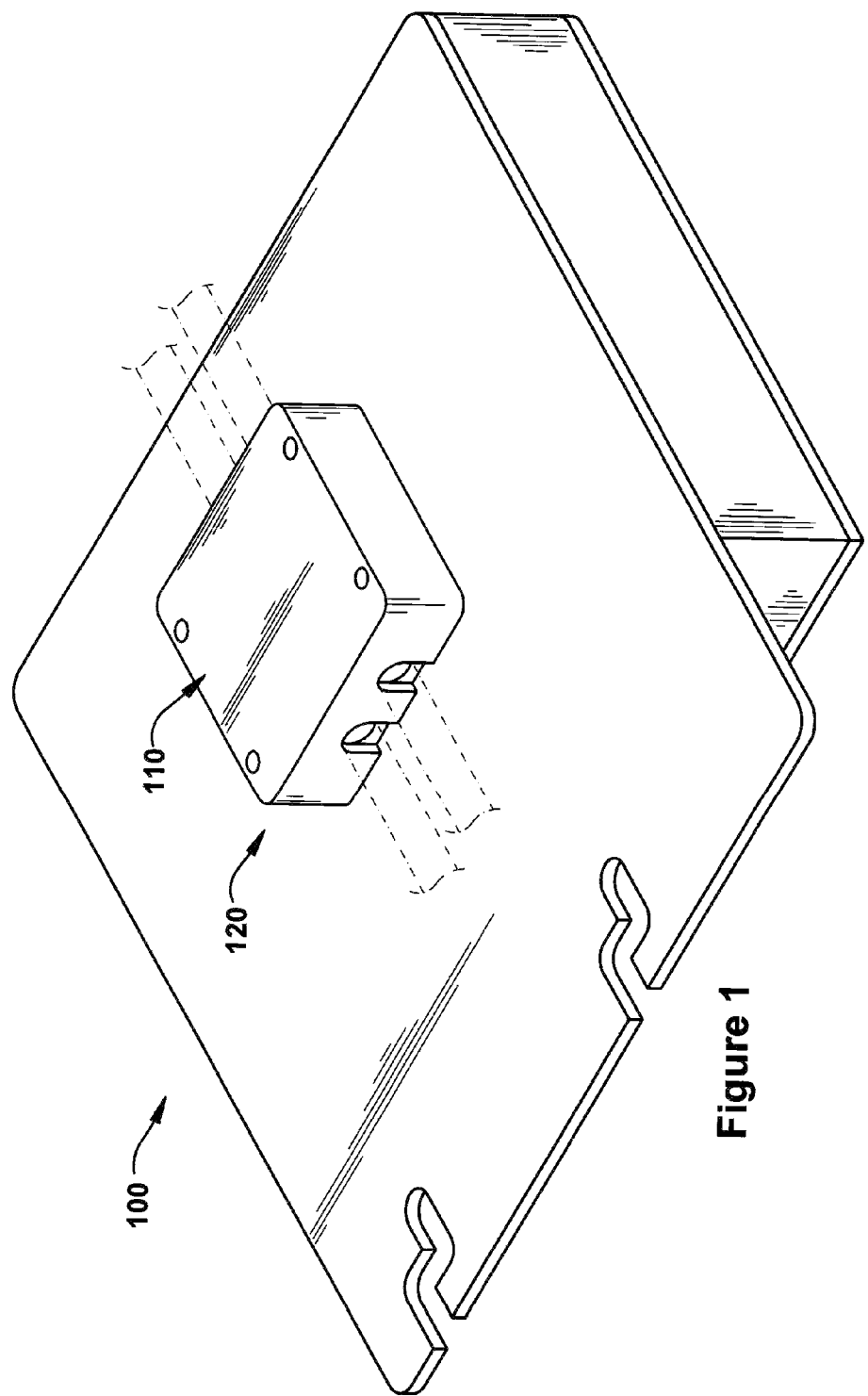
FIG. 1 illustrates a top view of an apparatus including a Solar IDC associated with an inverter.

Example apparatus and methods provide a Solar insulation displacement connector (IDC). The Solar IDC employs conductive cutters to act as terminals to an inverter. Wires may be seated in pathways containing cutters. Cutters are made of conductive materials (e.g., copper, silver, gold, nickel, brass). The cutters slice through the insulation of a wire and expose the conductor of the wire. The wire is held in place in the pathway such that the cutter stays in contact with the conductor of the wire. Thus, an electrical connection is formed between the cutter and the conductor of the wire. In addition to the connection between the cutter and the conductor of the wire, there is a connection between the cutter and the inverter. These connections cause the Solar IDC to create electrical continuity between the inverter's circuitry (e.g. printed circuit board) and the wires seated within the Solar IDC.

The Solar IDC and an inverter may be fabricated as a single unit. By fabricating the Solar IDC and the inverter together the number of post manufacture connections can be limited to only those that are connected in the field. This results in a reduction of connections that can lead to breaches in the sealing of the Solar IDC and inverter because the Solar IDC and the inverter do not need to be connected in the field. This is useful in the solar energy context where connections made post manufacture are typically done outdoors and are susceptible to environmental conditions.

Once post manufacture connections are made in the field, the Solar IDC is environmentally sealed. Environmental sealing is a barrier to environmental conditions that may degrade the effectiveness of the Solar IDC. Environmental conditions may include weather conditions (e.g., high winds, precipitation, freezing conditions), contaminants (e.g., smog, pollution), or terrain conditions. Terrain conditions are dependent on the location of the solar system. For example, in the solar energy context a solar system on a rooftop may encounter terrain conditions such as roofing materials (e.g., paint, tar, roofing nails) that may interfere with wires, the Solar IDC, or the inverter. A solar system located in a field may have to contend with different terrain conditions (e.g., pollen, animals, overgrowth).

The environmental sealing of the Solar IDC is a natural consequence of how the Solar IDC is formed. The Solar IDC's main body comprises two components: a base and a cover. The cover of the Solar IDC has a cover edge that fits over a base edge of the base of the Solar IDC. The cover edge and the base edge may be made out of a rigid material (e.g., plastic compounds, metal). The cover edge and the base edge form a dual barrier. Even if an environmental condition were to penetrate the cover edge of the cover, the Solar IDC would be protected by the base edge of the base. The environmental seal is further bolstered by the closeness of fit between the cover and the base. The fit may be enhanced with a flexible sealing agent (e.g., gasket, gel, adhesive). The flexible sealing agent may be reversible so that the cover of the Solar IDC can be removed from the base.

Cutouts in the cover edge and the base edge allow wires to enter and exit the Solar IDC. The cutouts may be fitted with grommets. The grommets act as an additional barrier to keep environmental conditions from affecting the Solar IDC. The grommets may vary in size allowing different gauge wire to be used. For example, gauge 2 wire may be used with grommet with a larger opening. For higher gauge wire, grommets with smaller openings may be used. Additionally, grommets may have no openings and thereby act as a cover. Grommets being used as covers may prevent environmental conditions from affecting the Solar IDC when an opening in the Solar IDC is not in use.

The interior of the Solar IDC contains a plurality of pathways. A pathway creates a clearance through the Solar IDC for a wire, where the wire consists of a conductor surrounded by an insulator. The wires may be of different make or manufacture and are not limited to a specific proprietary wire. The wires are held in place in the pathway with an appropriate amount of force by pressure protrusions affixed to the cover of the Solar IDC.

Cutters are located in the pathways. When a wire is held in place in a pathway, the wire is also forced onto a cutter in that pathway. The cutters are configured to displace the insulation of the wire and expose the conductor of the wire. Because the cutters are made of conductive materials, the cutters also act as terminals for the inverter. When the wire is placed in the cutter and held there by the pressure protrusions, the conductive cutter is held in contact with the conductor of the wire. Therefore, the cutters of the Solar IDC act as terminals allowing the wires within the Solar IDC to access the circuitry of the inverter.

In one embodiment, the Solar IDC has two pathways. Connections between wires are made in a pathway. A pathway may be configured with a pair of cutters. The cutter makes contact with the conductor of a wire. The cutter may be designed to make contact with the conductor of the wire on three sides. For example, the cutter may form a "U" shape, such that when the wire is seated into the "U" shape the insulation is displaced around roughly 75% of the wire. Alternatively, the cutter may form two parallel lines to slice through the insulation on either side of the wire. A cutter cuts through the insulation of the wire and makes contact with the conductor. By making contact with the conductor of the wire, the cutters act as terminals to the microinverter.

In one embodiment, the conductor of a first wire makes contact with the first cutter in the pair of cutters located in a pathway. The conductor of a second wire makes contact with the second cutter in the pair of cutters located in the pathway. In this manner, the first wire and the second wire are connected by the cutters because the cutters act as terminals for the inverter. Because the Solar IDC is wired in parallel, the type of connection (e.g. butt connection, splice connection) between the wires is inconsequential.

Also unlike conventional IDCs, the Solar IDC can accommodate both a butt connection and a splice connection. Specifically, the two pathways in the Solar IDC may accommodate two connections. For example, a first pathway may accommodate a butt connection in which two wires enter a first pathway of the Solar IDC from opposing sides of the Solar IDC. Pressure protrusions are located on the bottom of the cover of the Solar IDC. The pressure protrusions may be located above the cutters to apply adequate pressure on the wires into the cutters. A second pathway may accommodate a trunk line and an additional wire to create a splice connection. Thus, a first pathway may accommodate a splice connection and a second pathway may accommodate a butt connection. While two connections are described, more or fewer connections may be made in the Solar IDC with more or fewer pathways and cutters.

In one embodiment, wire retention mechanisms (e.g., clamps, wire retentions, grips) are used to apply pressure to the wire(s) in a pathway to hold the wire(s) in place. When the wire retention mechanisms apply pressure by way of mechanical force, the wire retention mechanisms prevent the wire(s) from being warped (e.g., pulled, twisted, bent) once the wire(s) are installed in a pathway of the Solar IDC.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

FIG. 1 illustrates an apparatus 100 that includes a Solar insulation displacement connector (IDC) 110. The Solar IDC 110 is configured to accommodate wires and allow the wires to make connections within the Solar IDC 110. The wires may be associated with a solar system. The apparatus 100 also includes an inverter 120. The inverter 120 may be a microinverter. The inverter 120 is configured to convert direct current (DC) to alternating current (AC). The inverter may be solar microinverter for converting DC from a solar panel to AC. The Solar IDC 110 and the inverter 120 may be fabricated as a single unit to reduce the number of post manufacture connections to connections made in the field.

FIG. 2A illustrates a top view of an apparatus 200 including a Solar IDC 110 with the cover 260 removed. The Solar IDC 110 comprises a base 210. The base 210 contains blocks 233, 235, and 237 that define pathways 243 and 247. Block 233 and block 235 define a first pathway 243. Likewise, block 235 and block 237 define a second pathway 247. The blocks 233, 235, and 237 can be placed in the base 210 based on the gauge of the wire being seated in the pathway. For example, if an application calls for a lower gauge (larger diameter) wire, the blocks 233 and 235 may be placed further apart to make the first pathway 243 wider. Alternatively, if an application calls for a larger gauge (smaller diameter) wire, the blocks 233 and 235 may be placed closer together to make the first pathway 243 narrower.

The first pathway 243 and the second pathway 247 do not have to be of equal width. The Solar IDC 110 may accommodate a plurality of varying connections. Accordingly, the width of the first pathway 243 and the second pathway 247 may be dependent on the type of the connection being made in the pathway. Blocks 233, 235, and 237 are secured to the base 210. The blocks 233, 235, and 237 may be secured using fasteners (e.g., screws, nuts, bolts) or adhesive.

The pathways 243 and 247 include cutters 252, 254, 256, and 258. The first pathway 243 has a first pathway first cutter 252 and a first pathway second cutter 254. Similarly, the second pathway 247 has a second pathway first cutter 256 and a second pathway second cutter 258. The cutters 252, 254, 256, and 258 may be placed in the pathways 243 and 247 based on the type of wire being used. Wires may be seated within a pathway to create connections that interface with the inverter 120.

In one embodiment, the first pathway first cutter 252 and the first pathway second cutter 254 in the first pathway 243 are wired to the inverter 120 to make a connection in conjunction with the second pathway first cutter 256 and the second pathway second cutter 258 in the second pathway 247. For example, a first wire may be seated in the first pathway 243. The first pathway first cutter 252 and the first pathway second cutter 254 cut through the insulation of the first wire and make contact with the conductor of the first wire. Thus, the conductor of the first wire uses the first pathway first cutter 252 and the first pathway second cutter 254 as terminals to the inverter 120. A second wire is seated in the second pathway 247. The second pathway first cutter 256 and the second pathway second cutter 258 cut through the insulation of the second wire and make contact with the conductor of the second wire. Thus, the conductor of the second wire uses the second pathway first cutter 256 and the second pathway second cutter 258 as terminals to the inverter 120. In this manner, the first wire is connected to the second wire through the inverter 120.

The first pathway first cutter 252 and the first pathway second cutter 254 in the first pathway 243 are wired to the inverter 120 such that two wires can be connected in the first pathway 243. For example, a first wire may be seated in a first portion of the first pathway 243 such that the first wire is cut by the first pathway first cutter 252. Thus, the conductor of the first wire uses the first pathway first cutter 252 as a terminal to the inverter 120. A second wire may be seated in a second portion of the first pathway 243 such that the second wire is cut by the first pathway second cutter 254. The conductor of the second wire uses the first pathway second cutter 254 as a terminal to the inverter 120. The second pathway first cutter 256 and the second pathway second cutter 258 may be wired similarly to act as terminals for the inverter so that a connection between two wires can be made in the second pathway 247. Thus, the Solar IDC 110 may be configured to accommodate two connections (e.g., a butt connection, a splice connection) at the same time.

In one embodiment, the first pathway 243 or the second pathway 247 may also accommodate a connection with a wire wired into the inverter 120. An inverter 120 has the inverter circuitry (e.g. printed circuit board) that may operate in conjunction with a wire wired into the inverter 120. Because the cutters 252, 254, 256, and 258 act as terminals to the inverter 120, a wire in the first pathway 243 or second pathway 247 may be connected with a wire wired into the inverter through the cutters 252, 254, 256, and 258.

FIG. 2B illustrates a bottom view of a Solar IDC cover 260 that has been removed. The Solar IDC cover 260 is configured with pressure protrusions 262, 264, 266, and 268. The pressure protrusions are affixed (e.g. epoxy, sealant, screws) to the Solar IDC cover 260. Alternatively, the pressure protrusions 262, 264, 266, and 268 to the Solar IDC cover 260 may be fabricated as a single piece.

The pressure protrusions are configured to apply pressure to a wire in a pathway, thereby forcing the wire to be seated on a cutter. The pressure protrusions 262, 264, 266, 268 may be positioned directly over the cutters 252, 254, 256, and 258 (shown in FIG. 2A) causing a wire to be pushed down on the cutters 252, 254, 256, and 258 when the Solar IDC cover 260 is fitted on the base 210. For example, pressure protrusion 262 may be positioned directly over the first pathway first cutter 252. Pressure protrusion 264 may be positioned directly over the first pathway second cutter 254. Thus, when a wire is placed in pathway 243 (shown in FIG. 2A), pressure protrusions 262 and 264 push the wire on to the cutters 252 and 254, respectively. Consequently, the insulation of the wire is cut by the cutters 252 and 254 and the cutters 252 and 254 are held in contact with the exposed conductor of the wire. Thereby improving the ability of the cutters 252 and 254 to act as terminals for the inverter 120 (shown in FIG. 2A).

FIG. 3A illustrates a cross-sectional view of apparatus 200 including a Solar IDC 110, with the cover 260 of the Solar IDC 110 removed, associated with an inverter 120. The base 210 of the Solar IDC 110 has a base edge 310 that extends perpendicularly from the base 210. The base edge 310 may be made out of a rigid material (e.g., plastic compounds, metal).

FIG. 3B illustrates a cross-sectional view of a cover 260 of a Solar IDC 110. The Solar IDC cover 260 has a cover edge 370. The cover edge 370 may be made out of a rigid material (e.g., plastic compounds, metal). The base edge 310 and the cover edge 370 form a dual barrier. Even if an environmental condition were to penetrate the cover edge 370, the Solar IDC 210 would be protected by the base edge 310. Therefore, an environmental condition would have to penetrate the cover edge 370 and the base edge 310. The possibility of that occurring is reduced by the close fit of the cover edge 370 and the base edge 310. The fit may be enhanced with a flexible sealing agent (e.g., gasket, gel, adhesive). The flexible sealing agent may be reversible so that the Solar IDC cover 260 can be removed from the base 210 of the Solar IDC 110.

Figure 4B:
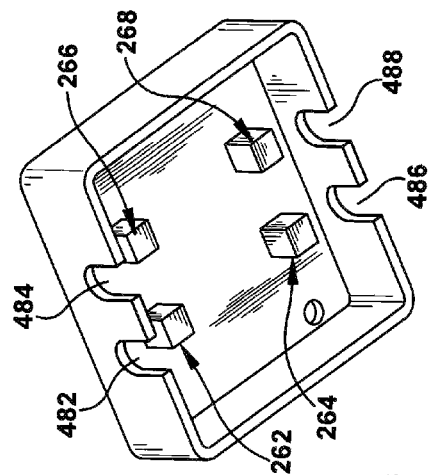
FIG. 4B illustrates an embodiment of a cover of a Solar IDC.
Figure 4A:
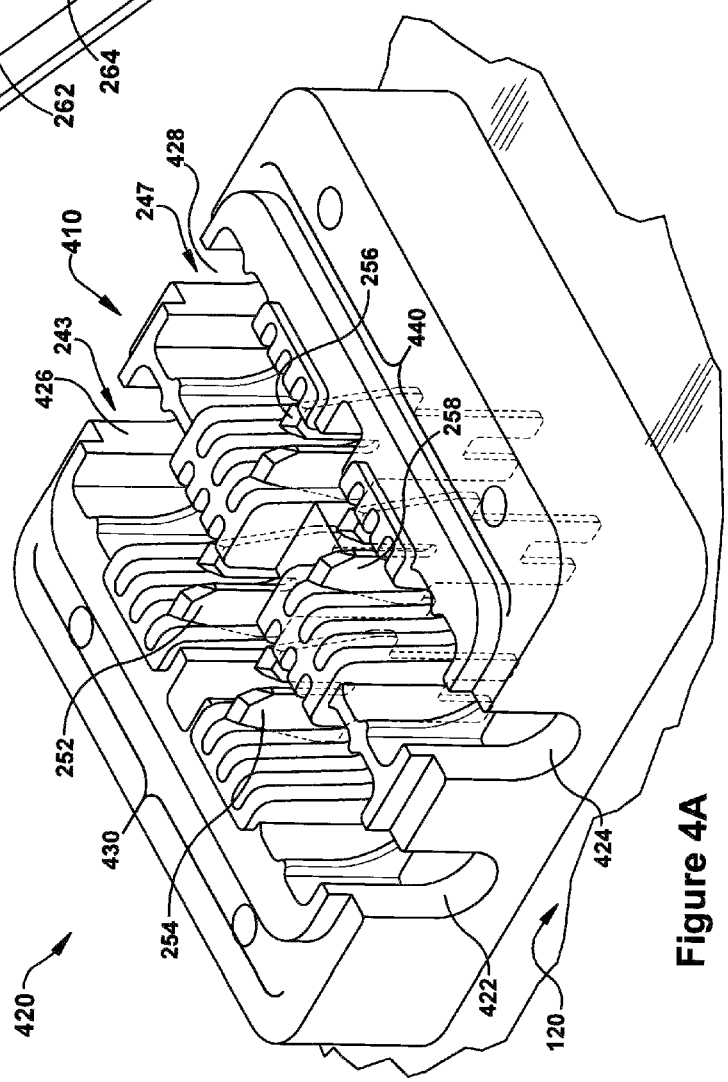
FIG. 4A illustrates an embodiment of a Solar IDC.

FIG. 4A illustrates a Solar IDC 410. In one embodiment, the Solar IDC 410 may be secured to the top surface of the inverter 120 with fasteners (e.g., screws, nuts, bolts) or adhesive. The base edge 310 has base cutouts 422, 424, 426, and 428. The base cutouts 422, 424, 426, and 428 provide clearance for wires entering and exiting the Solar IDC 110.

A wire seated in the first pathway 243 may enter the Solar IDC 210 through base cutout 422 and exit the Solar IDC 210 through base cutout 426. Likewise, a wire seated in the second pathway 247 may enter the base 210 of the Solar IDC 110 through base cutout 424 and exit the Solar IDC 110 through base cutout 428. One of ordinary skill in the art will recognize that the size of the base cutouts 422, 424, 426, and 428 may be dependent on the gauge of wire being used in conjunction with the Solar IDC 110.

The base cutouts 422, 424, 426, and 428 may be fitted with grommets to create an environmental barrier to prevent environmental contaminates from entering the Solar IDC 110 through base cutouts 422, 424, 426, and 428. A grommet may be configured to create a seal between a base cutout 422, 424, 426, and 428 and the wire. Additionally, the base cutouts 422, 424, 426, and 428 may be configured with covers to prevent environmental contaminates from entering the Solar IDC 110 when a base cutout 422, 424, 426, or 428 is not in use.

The Solar IDC 410 is formed with a plurality of ridges 430 and 440. The area between the plurality of ridges 430 and 440 passes through the Solar IDC 410. The Solar IDC 410 has a plurality of ridges 430 in the first pathway 243 and a plurality of ridges 440 in the second pathway 247. The area between the plurality of ridges 430 and 440 is comprised of openings. The Solar IDC 410 is affixed to the inverter 120 to allow the cutters 252, 254, 256, and 258 access from the interior of the inverter 120 through the openings into the interior of the Solar IDC 410.

The first pathway 243 includes the first pathway first cutter 252 and the first pathway second cutter 254. The second pathway 247 includes the second pathway first cutter 256 and the second pathway second cutter 258. The first pathway first cutter 252 and the first pathway second cutter 254 are configured to protrude through the openings in ridges 430. The cutters 252 and 254 may be strategically placed through the openings in ridges 430 based at least in part on the gauge of the wire, the length of the wire, or type of connection. Similarly, the second pathway first cutter 256 and the second pathway second cutter 258 may be configured to protrude through the openings of ridges 440.

FIG. 4B illustrates a bottom view of a Solar IDC cover 260 that has been removed. The cover edge 370 of the Solar IDC cover 260 has cover cutouts 482, 484, 486, and 488. The cover cutouts 482, 484, 486, and 488 provide clearance for wires entering and exiting the Solar IDC 210 when the Solar IDC cover 260 is fitted on the Solar IDC 210. The cover cutouts 482, 484, 486, and 488 are aligned with the base cutouts 422, 424, 426, and 428. For example, when the Solar IDC cover 260 is on the base 210 of the Solar IDC 110, cover cutout 482 may be aligned with base cutout 422, and cover cutout 386 may be aligned with base cutout 426. Thus, when the Solar IDC cover 260 is placed on the base 210 of the Solar IDC 110, a wire may pass through the first pathway 243 through base cutouts 422 and 426 and cover cutouts 482 and 486. Likewise, cover cutout 484 may be aligned with base cutout 424, and cover cutout 488 may be aligned with base cutout 428. Thus, when the Solar IDC cover 260 is placed on the base 210 of the Solar IDC 110, a wire may pass through the second pathway 247 through base cutouts 424 and 428 and cover cutouts 484 and 488.

The cover cutouts 482, 484, 486, and 488 may be fitted with grommets to create an environmental barrier to prevent environmental contaminates from entering the Solar IDC 210. A grommet may be configured to create a seal between a cover cutout 482, 484, 486, and 488 and the wire. Additionally, the cover cutouts 482, 484, 486, and 488 may be configured with covers to prevent environmental contaminates from entering the Solar IDC 210 when a base cutout 422, 424, 426, or 428 is not in use. Alternatively, a grommet may be configured to work with both a base cutout and a cover cutout.

Figure 5B:
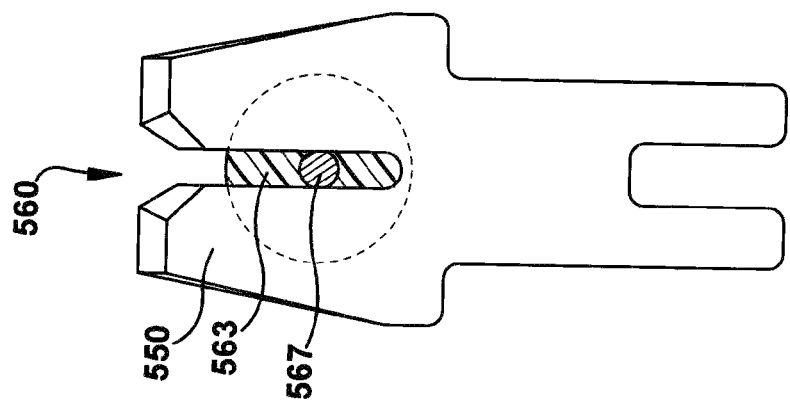
FIG. 5B illustrates a cross-sectional view of an example wire for use in conjunction with a cutter of a Solar IDC.
Figure 5A:
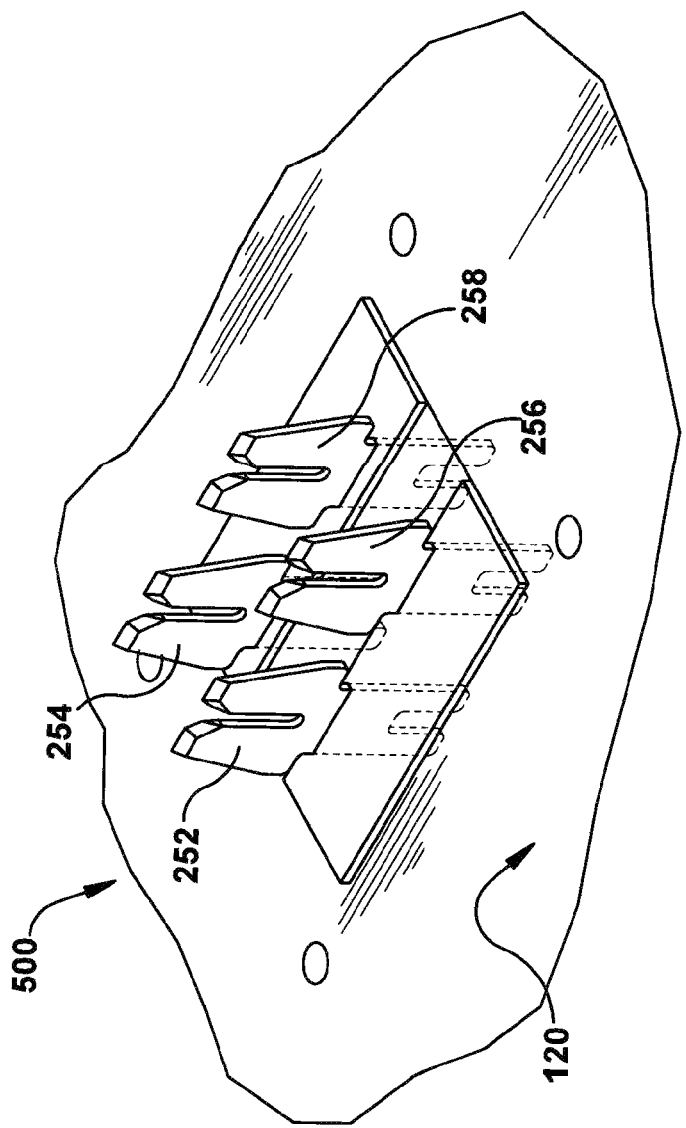
FIG. 5A illustrates additional detail of the interior of a Solar IDC.

FIG. 5A illustrates additional detail for the interior of a Solar IDC. Cutters 252, 254, 256, and 258 act as terminals for the inverter 120 when in contact with the conductor of a wire. The cutters 252, 254, 256, and 258 may be wired to the components of the inverter 120. Thus, the cutters 252, 254, 256, and 258 may be fabricated with the inverter 120 such that the cutters 252, 254, 256, and 258 extend through the top of the inverter 120. In addition to extending through the top of the inverter 120, the cutters 252, 254, 256, and 258 may extend through the understructure 410 (shown in FIG. 4) of the Solar IDC 110.

FIG. 5B illustrates a cross-sectional view of an example wire 560 for use in conjunction with a cutter 550 of a Solar IDC. The wire 560 includes insulation 563 and conductor 567. The wire 560 is placed in the cutter 550. The cutter 550 is constructed of a conductive metal (e.g., silver, gold, brass, copper, zinc, nickel). The edges of the cutter 550 may be sharpened facilitate cutting the insulation 563 of the wire 560. When the wire 560 is pushed into the in the cutter 550 it is sliced open displacing the insulation 563. The displaced insulation 563 exposes the conductor 567 of the wire 560. By exposing the conductor 567 of the wire 560, the cutter 550 is able to make contact with the conductive cutter 550. In addition to cutting the insulation 563 of the wire 560, the cutter 550 acts as a terminal for and inverter 120 (shown in FIG. 5A) since the cutter 550 is conductive.

While example apparatus have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
an insulation displacement connector (IDC) having a base configured with at least one pathway, where the at least one pathway is configured with at least one conductive cutter, and an IDC cover configured to hold a wire in the at least one pathway when the IDC cover is affixed to the base;
where the IDC is configured to be mechanically connected to a conductor of the wire by at least one conductive cutter, where the at least one conductive cutter is configured to cut an insulation of the wire, and where the at least one conductive cutter acts as a terminal for the inverter; and
an inverter operably connected to the IDC, where the IDC and the inverter are fabricated as a unit;
where the base of the IDC further comprises: a plurality of ridges in the at least one pathway, where area between the ridges is comprised of openings, and where the IDC is affixed to the inverter to allow the at least one conductive cutter access to the interior of the inverter and the interior of the IDC.

2. The apparatus of claim 1, where the wire comprises the conductor of the wire surrounded by the insulation of the wire.

3. The apparatus of claim 2, where the IDC cover is configured with cover cutouts that correspond to the base cutouts, providing clearance for the wire through the IDC when the IDC cover is affixed to the base.

4. The apparatus of claim 1, where the IDC cover is configured with pressure protrusions, where the pressure protrusions are configured to hold the wire in the at least one pathway.

5. The apparatus of claim 1, where a cutter is affixed to the inverter and passes through the openings and into the pathway of the IDC.

6. The apparatus of claim 1, where the size of the pathways and conductive cutters is determined by a characteristic of the wire.

7. An insulation displacement connector (IDC) apparatus, comprising:
a plurality of conductive cutters, where a conductive cutter is configured to displace the insulation of at least one wire and make contact with a conductor of the at least one wire, and where the conductive cutter is configured to be a terminal to operably connect the conductor of the at least one wire with an inverter, and
a plurality of pathways, where a pathway is configured with at least one conductive cutter of the plurality of conductive cutters, and where a pathway is configured to accommodate at least on wire;
the IDC apparatus being configured to be constructed with the inverter as a single unit;
where a first pathway having a first conductive cutter as a first terminal for the inverter,
where the first pathway is configured to accommodate a first wire; and a second pathway having a second conductive cutter as a second terminal for the inverter, where the second pathway is configured to accommodate a second wire; and
where a conductive connection is made between the first wire and the second wire through the inverter.

8. The IDC apparatus of claim 7, where a pathway of the plurality of pathways is configured with at least two conductive cutters.

9. The IDC apparatus of claim 7, where the first pathway and the second pathway are configured to accommodate both a splice connection and a butt connection.

10. The IDC apparatus of claim 7, where the first pathway is configured to accommodate both a splice connection and a butt connection.

11. The IDC apparatus of claim 7, comprising
a second pathway having a second pathway first conductive cutter and a second pathway second conductive cutter, where the second pathway first conductive cutter is configured as third terminal for the inverter to accommodate a third wire in the second pathway, and where a second pathway second conductive cutter is configured as a fourth terminal for the inverter to accommodate a fourth wire in the second pathway; and
where a connection is made between the third wire in the second pathway and the fourth wire in the second pathway through the inverter.

12. The IDC apparatus of claim 7, where the IDC apparatus is environmentally sealed, and where at least one wire in a pathway of the IDC apparatus is protected from environmental conditions.

13. The IDC apparatus of claim 7, where at least one wire can be removed from the IDC apparatus and the IDC apparatus can be used with a different wire.

14. The IDC apparatus of claim 7, where the inverter is a microinverter.

15. The IDC apparatus of claim 14, where the at least one wire is accommodated by the pathway and the microinverter is wired with a microinverter wire; and where a connection is made between the at least one wire and the microinverter wire through the inverter.

* * * * *

UNITED STATES PATENT AND TRADEMARK OFFICE
CERTIFICATE OF CORRECTION

PATENT NO. : 8,684,761 B2  
APPLICATION NO. : 13/355750  
DATED : April 1, 2014  
INVENTOR(S) : Weaver et al.

Page 1 of 1

It is certified that error appears in the above-identified patent and that said Letters Patent is hereby corrected as shown below:

In the Specification:

In Column 3, lines 57-58, delete "used with grommet" and insert --used with grommets--.

In Column 7, line 64, delete "cover cutout 386" and insert --cover cutout 486--.

In Column 8, line 35, delete "sharpened facilitate" and insert --sharpened to facilitate--.

In Column 8, line 36, delete "pushed into the in the cutter" and insert --pushed into the cutter--.

In the Claims:

In column 10, line 7, delete "on" and insert --one--.

Signed and Sealed this  
Nineteenth Day of August, 2014

Michelle K. Lee  
*Deputy Director of the United States Patent and Trademark Office*